(12) United States Patent
Yamamoto et al.

(10) Patent No.: US 10,275,652 B2
(45) Date of Patent: Apr. 30, 2019

(54) INFORMATION PROCESSING METHOD, INFORMATION PROCESSING APPARATUS, AND NON-TRANSITORY COMPUTER-READABLE STORAGE MEDIUM THAT DETERMINE WHETHER A TARGET PERSON IS AN IMPORTANT PERSON BASED ON IMPORTANCE DEGREES

(71) Applicant: CANON KABUSHIKI KAISHA, Tokyo (JP)

(72) Inventors: Tatsuya Yamamoto, Tokyo (JP); Fumitaka Goto, Tokyo (JP); Hiroyasu Kunieda, Yokohama (JP); Sammy Chan, Beecroft (AU)

(73) Assignee: Canon Kabushiki Kaisha, Tokyo (JP)

( * ) Notice: Subject to any disclaimer, the term of this patent is extended or adjusted under 35 U.S.C. 154(b) by 247 days.

(21) Appl. No.: 15/219,375

(22) Filed: Jul. 26, 2016

(65) Prior Publication Data

US 2017/0039427 A1 Feb. 9, 2017

(30) Foreign Application Priority Data

Aug. 7, 2015 (JP) ................................. 2015-157503

(51) Int. Cl.
*G06K 9/00* (2006.01)
*G06K 9/62* (2006.01)
(Continued)

(52) U.S. Cl.
CPC ... *G06K 9/00677* (2013.01); *G06F 17/30247* (2013.01); *G06K 9/00228* (2013.01);
(Continued)

(58) Field of Classification Search
None
See application file for complete search history.

(56) References Cited

U.S. PATENT DOCUMENTS 6,658,170 B1 12/2003 Nakatani et al.
7,031,535 B2 4/2006 Yamamoto
(Continued)

FOREIGN PATENT DOCUMENTS

JP 2007-049387 A 2/2007
JP 2011/089872 A1 7/2011
JP 5330530 B2 10/2013

OTHER PUBLICATIONS

Communication with Extended European Search Report dated Jan. 3, 2017, issued in corresponding European Patent Application No. 16001639.0-1903.

*Primary Examiner* — Chan S Park
*Assistant Examiner* — Elisa M Rice
(74) *Attorney, Agent, or Firm* — Venable LLP

(57) ABSTRACT

In an information processing method, the importance degree of each person who appears in a first image group and the importance degree of each person who appears in a second image group, containing the first image group, are determined, and, when selecting the image of the output target from the first image group, in a case in which the importance degree of a candidate image of the output target included in the first image group, which is determined from the appearance count in the first image group, exceeds a first threshold, and, in a case in which the importance degree of the candidate image of the output target, which is determined from the appearance count in the second image group, exceeds a second threshold, the candidate image is selected as the output target.

18 Claims, 14 Drawing Sheets

(51) Int. Cl.
*H04N 1/00* (2006.01)
*G06F 17/30* (2006.01)

(52) U.S. Cl.
CPC ..... *G06K 9/00288* (2013.01); *H04N 1/00196* (2013.01); *G06K 9/6218* (2013.01)

(56) References Cited

U.S. PATENT DOCUMENTS

| | | |
|---|---|---|
| 7,239,347 B2 | 7/2007 | Yamamoto et al. |
| 7,432,909 B2 | 10/2008 | Yamamoto et al. |
| 7,432,985 B2 | 10/2008 | Ishikawa et al. |
| 7,522,195 B2 | 4/2009 | Yamamoto et al. |
| 7,924,469 B2 | 4/2011 | Ono et al. |
| 7,944,588 B2 | 5/2011 | Yamada et al. |
| 8,082,573 B2 | 12/2011 | Miyamoto et al. |
| 8,102,558 B2 | 1/2012 | Goto et al. |
| 8,175,155 B2 | 5/2012 | Suwa et al. |
| 8,237,991 B2 | 8/2012 | Ono et al. |
| 8,405,876 B2 | 3/2013 | Nakatani et al. |
| 8,712,168 B2 | 4/2014 | Yamaguchi |
| 8,738,622 B2 | 5/2014 | Chan |
| 8,929,669 B2 | 1/2015 | Yabu |
| 9,189,681 B2 | 11/2015 | Kunieda et al. |
| 9,214,027 B2 | 12/2015 | Sumi et al. |
| 9,275,270 B2 | 3/2016 | Suwa et al. |
| 2012/0002881 A1 | 1/2012 | Maeda |
| 2012/0148165 A1 | 6/2012 | Yabu |
| 2012/0170856 A1* | 7/2012 | Yamaguchi ....... G06F 17/30247 382/224 |
| 2012/0268759 A1 | 10/2012 | Ono et al. |
| 2012/0281887 A1 | 11/2012 | Yamaguchi |
| 2014/0013213 A1 | 1/2014 | Kajiwara et al. |
| 2016/0062716 A1 | 3/2016 | Sasaki et al. |
| 2016/0371536 A1* | 12/2016 | Yamaji ............... G06K 9/00677 |

\* cited by examiner

FIG. 3

| CAPTURED IMAGE | EVENT | FACE | |
|---|---|---|---|
| P_00001.jpg | E1 | F_001, F_005, F_006 | ~301 |
| P_00002.jpg | E1 | F_005, F_006 | |
| P_00003.jpg | E1 | F_001, F_002, F_003 | |
| ⋮ | | | |
| P_02055.jpg | E17 | F_001 | |
| P_02056.jpg | E17 | F_002, F_003 | |
| P_02057.jpg | E17 | — | |

302 points to the P_00001.jpg row; 303 points to the P_00002.jpg row.

F I G. 4

| EVENT | FACE | APPEARANCE COUNT | SCORE |
|---|---|---|---|
| E0 | F_001 | 213 | 1.000 |
| E0 | F_002 | 192 | 0.901 |
| E0 | F_003 | 157 | 0.737 |
| E0 | F_004 | 8 | 0.038 |
| E0 | F_005 | 37 | 0.174 |
| ⋮ | | | |
| E0 | F_022 | 1 | 0.005 |
| E1 | F_001 | 9 | 1.000 |
| E1 | F_002 | 8 | 0.888 |
| ⋮ | | | |
| E16 | F_012 | 3 | 0.300 |
| E17 | F_001 | 3 | 0.125 |
| E17 | F_005 | 21 | 0.875 |
| E17 | F_006 | 24 | 1.000 |
| E17 | F_008 | 1 | 0.041 |
| E17 | F_020 | 3 | 0.125 |
| E17 | F_021 | 2 | 0.083 |
| E17 | F_022 | 1 | 0.041 |

FIG. 9

| EVENT | PERSON LIST | |
|---|---|---|
| E1 | F_001, F_002, F_003, F_005, F_006 | ←901 |
| E2 | F_001, F_007, F_010, F_013, F_015 | ←902 |
| E3 | F_001, F_002, F_003 | |
| E4 | F_001, F_007, F_010, F_013, F_015, F_016 | ←903 |
| ⋮ | ⋮ | |
| E17 | F_001, F_005, F_006, F_008, F_020, F_021, F_022 | |

FIG. 10A

| EVENT | FACE | APPEARANCE COUNT | SCORE |
|---|---|---|---|
| E_0002 | F_001 | 5 | 1.000 |
| E_0002 | F_007 | 2 | 0.333 |
| E_0002 | F_010 | 2 | 0.333 |
| E_0002 | F_013 | 2 | 0.333 |
| E_0002 | F_015 | 2 | 0.333 |
| ... | | | |
| E_0004 | F_001 | 12 | 1.000 |
| E_0004 | F_007 | 3 | 0.250 |
| E_0004 | F_010 | 8 | 0.666 |
| E_0004 | F_013 | 2 | 0.166 |
| E_0004 | F_015 | 2 | 0.166 |
| E_0004 | F_016 | 3 | 0.250 |
| ... | | | |

FIG. 10B

| EVENT | FACE | APPEARANCE COUNT | SCORE |
|---|---|---|---|
| E_0002 | F_001 | 17 | 1.000 |
| E_0002 | F_007 | 5 | 0.294 |
| E_0002 | F_010 | 10 | 0.588 |
| E_0002 | F_013 | 4 | 0.235 |
| E_0002 | F_015 | 4 | 0.235 |
| ... | | | |
| E_0004 | F_001 | 12 | 1.000 |
| E_0004 | F_007 | 3 | 0.250 |
| E_0004 | F_010 | 8 | 0.666 |
| E_0004 | F_013 | 2 | 0.166 |
| E_0004 | F_015 | 2 | 0.166 |
| E_0004 | F_016 | 3 | 0.250 |
| ... | | | |

F I G. 12

| EVENT | FACE | APPEARANCE COUNT | SCORE |
|---|---|---|---|
| E0 | F_001 | 17 | 1.000 |
| E0 | F_002 | 13 | 0.765 |
| E0 | F_003 | 12 | 0.706 |
| E0 | F_004 | 2 | 0.118 |
| E0 | F_005 | 4 | 0.235 |
| ⋮ | | | |
| E0 | F_022 | 1 | 0.059 |
| E1 | F_001 | 9 | 1.000 |
| E1 | F_002 | 8 | 0.888 |
| ⋮ | | | |
| E16 | F_012 | 3 | 0.300 |
| E17 | F_001 | 3 | 0.125 |
| E17 | F_005 | 21 | 0.875 |
| E17 | F_006 | 24 | 1.000 |
| E17 | F_008 | 1 | 0.041 |
| E17 | F_020 | 3 | 0.125 |
| E17 | F_021 | 2 | 0.083 |
| E17 | F_022 | 1 | 0.041 |

~1201

INFORMATION PROCESSING METHOD, INFORMATION PROCESSING APPARATUS, AND NON-TRANSITORY COMPUTER-READABLE STORAGE MEDIUM THAT DETERMINE WHETHER A TARGET PERSON IS AN IMPORTANT PERSON BASED ON IMPORTANCE DEGREES

CLAIM TO PRIORITY

This application claims the benefit of Japanese Patent Application No. 2015-157503, filed Aug. 7, 2015, which is hereby incorporated by reference herein in its entirety.

BACKGROUND OF THE INVENTION

Field of the Invention

The present invention relates to an information processing method, an information processing apparatus, and a non-transitory computer-readable storage medium.

Description of the Related Art

Some recent photobook creation apparatuses for selecting images from an image group and creating a photobook calculate the importance degree of each image and provide important images, thereby saving time and effort in selecting images. To select an image assumed to be important for a user, some apparatuses use not only the information of sharpness, defocus, and blur of an image, but also, the information of a person included in an image. When calculating the importance degree of an image using the information of a person, it is preferably judged whether the person in the image is important. For example, an image captured during a travel includes local passers and the like as well as the traveler himself/herself. To raise the importance degree of an image including the traveler as compared to an image of a passer, it is necessary to judge which person is important.

As a method of judging whether a person included in an image is important, Japanese Patent No. 5330530 describes a method of calculating how many times a person appears in an image group and judging a person who appears many times in the image group as important.

However, when creating a photobook by judging important persons in an image group corresponding to a specific event, not only persons who appear many times in the specific event, but also, persons of an intimate relation such as family members who appear many times in other events should be judged as important. For example, the bride and bridegroom in a wedding that a user attends appear many times in the event (wedding) and are, therefore, assumed to be important persons. On the other hand, the photographer himself/herself and the photographer's family attending the wedding are also assumed to be important persons. In the method of Japanese Patent No. 5330530, the importance degree may lower for a person such as a photographer himself/herself or his/her family who appears many times throughout other events, but rarely in an image group (for example, a wedding) as the target of photobook creation.

SUMMARY OF THE INVENTION

The present invention has been made in consideration of the above-described problem, and enables a more correct selection of an image including an important person from some image groups by considering an appearance count in the image group of a plurality of events and appearance counts in image groups of events that are some of the plurality of events.

According to one aspect, the present invention provides an information processing method comprising determining an importance degree of each person who appears in an image group using an appearance count of a person who appears in the image group and selecting an image of an output target from the image group based on the importance degree determined in the determining, wherein, in the determining, the importance degree of each person who appears in a first image group and the importance degree of each person who appears in a second image group containing the first image group are determined, and in the selecting, when selecting the image of the output target from the first image group, in a case in which the importance degree of a candidate image of the output target included in the first image group, which is determined from the appearance count in the first image group, exceeds a first threshold, and, in a case in which the importance degree of the candidate image of the output target, which is determined from the appearance count in the second image group, exceeds a second threshold, the candidate image is selected as the output target.

According to another aspect, the present invention provides an information processing apparatus comprising a determination unit configured to determine an importance degree of each person who appears in an image group using an appearance count of a person who appears in the image group and a selection unit configured to select an image of an output target from the image group based on the importance degree determined by the determination unit, wherein the determination unit determines the importance degree of each person who appears in a first image group and the importance degree of each person who appears in a second image group containing the first image group, and, when selecting the image of the output target from the first image group, in a case in which the importance degree of a candidate image of the output target included in the first image group, which is determined from the appearance count in the first image group, exceeds a first threshold, and, in a case in which the importance degree of the candidate image of the output target, which is determined from the appearance count in the second image group, exceeds a second threshold, the selection unit selects the candidate image as the output target.

According to another aspect, the present invention provides a non-transitory computer-readable storage medium storing a program that causes a computer to function as a determination unit configured to determine an importance degree of each person who appears in an image group using an appearance count of a person who appears in the image group and a selection unit configured to select an image of an output target from the image group based on the importance degree determined by the determination unit, wherein the determination unit determines the importance degree of each person who appears in a first image group and the importance degree of each person who appears in a second image group containing the first image group, and. when selecting the image of the output target from the first image group, in a case in which the importance degree of a candidate image of the output target included in the first image group, which is determined from the appearance count in the first image group, exceeds a first threshold and, in a case in which the importance degree of the candidate image of the output target, which is determined from the appearance count in the second image group, exceeds a second threshold, the selection unit selects the candidate image as the output target.

According to the present invention, it is possible to more correctly select an image including an important person in an image group.

Further features of the present invention will become apparent from the following description of exemplary embodiments (with reference to the attached drawings).

BRIEF DESCRIPTION OF THE DRAWINGS

FIG. 3 is a view showing an image management table according to the embodiment;

FIG. 4 is a view showing a person score table according to the embodiment;

FIG. 9 is a view showing a person list table according to the second embodiment;

FIGS. 10A and 10B are views for explaining a person score table according to the second embodiment;

FIG. 12 is a view for explaining a person score table according to the third embodiment;

DESCRIPTION OF THE EMBODIMENTS

Preferred embodiments of the present invention will now be described in detail with reference to the accompanying drawings. Note that the arrangements to be described in the following embodiments are merely examples, and the present invention is not limited to the illustrated arrangements.

First Embodiment

[System Arrangement]

Figure 1:
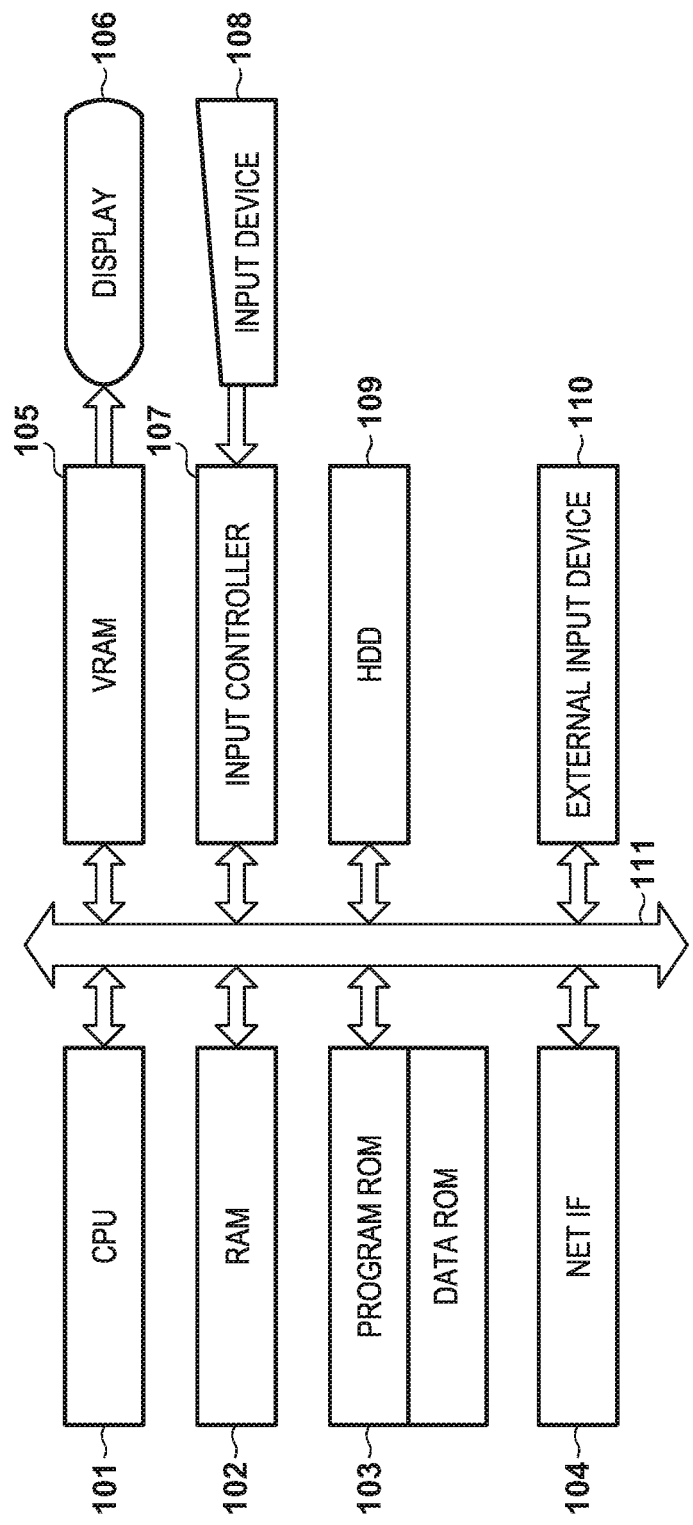
FIG. 1 is a block diagram showing an example of the hardware arrangement of an information processing apparatus according to an embodiment.

FIG. 1 is a block diagram showing an example of the hardware arrangement of an information processing apparatus as a photobook creation apparatus according to this embodiment. Note that, in this embodiment, an important person judging apparatus is included in the photobook creation apparatus and formed by the same hardware. However, the arrangement is not limited to this, and the important person judging apparatus and the photobook creation apparatus may be formed by different physical apparatuses. In addition, the important person judging apparatus can be included in any apparatus as long as it is an image content using apparatus using the information of an important person, such as an image sharing apparatus that manages user images and recommends image sharing to an important person.

A CPU 101 is a central processing unit that controls a computer system. The CPU 101 executes information calculation and processing, or hardware control, based on a control program stored in a storage unit such as an HDD 109, thereby implementing each functional arrangement and processing to be described later. A RAM 102 is a random access memory, which functions as the main memory of the CPU 101 or a work memory necessary to load an execution program or execute the program. A ROM 103 is a read only memory, which records a control program for defining the operation processing procedure of the CPU 101. The ROM 103 includes a program ROM that records basic software (OS: Operating System) as a system program for controlling the devices of the computer system, and a data ROM that records information necessary for the operation of the system. The HDD 109 may be used in place of the ROM 103.

A NET IF 104 is a network interface, which performs input/output control of image information transmitted/received via a network. A video RAM (to be referred to as a VRAM hereafter) 105 rasterizes an image to be displayed on the screen of a display 106 that is a display device. The display 106 is a display device, for example, a CRT display or a liquid crystal display. A controller 107 controls an input signal from an input device 108. The input device 108 is an external input device configured to receive an operation instruction from the user, and examples are a touch panel, a keyboard, and a mouse. The HDD (hard disk drive) 109 is a nonvolatile storage device. The HDD 109 is used to store an application program or data such as image information. An external input device 110 is an external input/output device such as a CD (DVD)-ROM drive or a memory card drive, and is used, for example, to read out image data captured by a digital camera. An input/output bus 111 is an input/output bus (an address bus, a data bus, and a control bus) configured to connect the above-described units.

Figure 2:
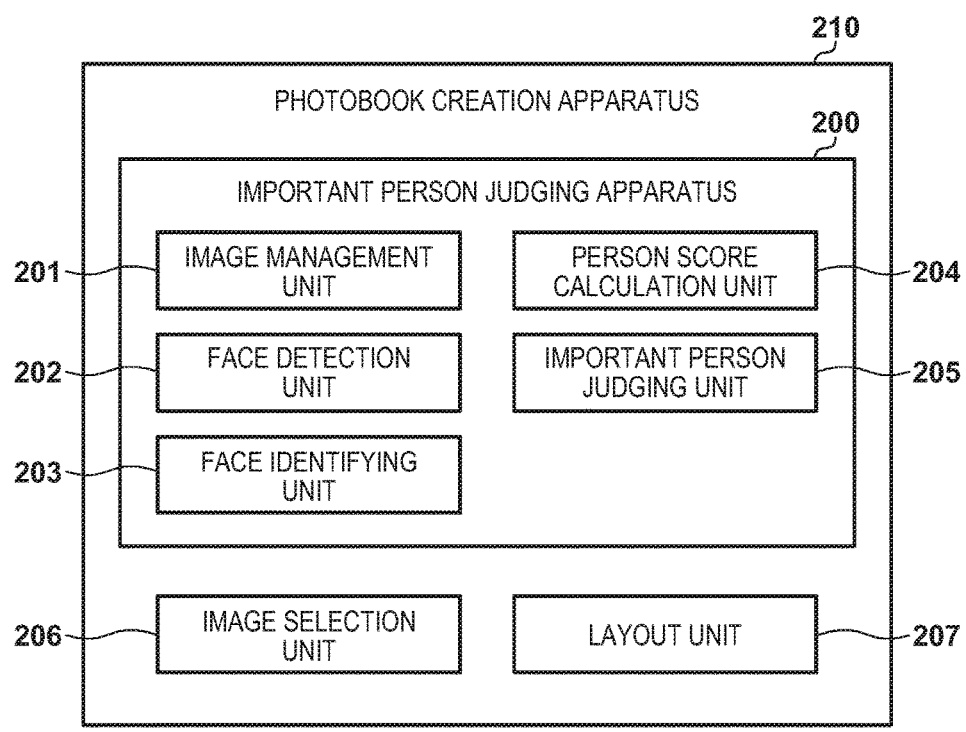
FIG. 2 is a block diagram showing an example of the functional arrangements of apparatuses according to the first embodiment.

FIG. 2 shows the functional arrangements of a photobook creation apparatus 210 and an important person judging apparatus 200 according to this embodiment. The photobook creation apparatus 210 includes the important person judging apparatus 200, an image selection unit 206, and a layout unit 207. The important person judging apparatus 200 includes an image management unit 201, a face detection unit 202, a face identifying unit 203, a person score calculation unit 204, and an important person judging unit 205.

The image management unit 201 manages, in an image management table 301 shown in FIG. 3, captured image files and the information of faces detected and identified from the images by the face detection unit 202 and the face identifying unit 203. Image groups managed here are the candidates of images to be laid out on a template. Based on the images and the information of identified faces managed by the image management unit 201, the person score calculation unit 204 calculates a person score representing the importance degree of each person in accordance with a processing procedure shown in FIG. 6. Based on the person score calculated by the person score calculation unit 204, the important person judging unit 205 judges an important person in accordance with a processing procedure shown in FIG. 7. The image selection unit 206 selects an image to be used in a photobook from the images managed by the image management unit 201 using the information of the important person judged by the important person judging unit 205. The layout unit 207 lays out the image selected by the image selection unit 206 on a predetermined template (photobook).

The image management table 301 shown in FIG. 3 is a table of image information managed by the image management unit 201. The image management table 301 is formed from the file name of an image, the event ID of an event in which the image is captured, and a face ID uniquely indicating a face identified from the image. The event ID is an ID (identification information) assigned to an image group that collects captured images on an event basis, as shown in FIG. 14.

Figure 14:
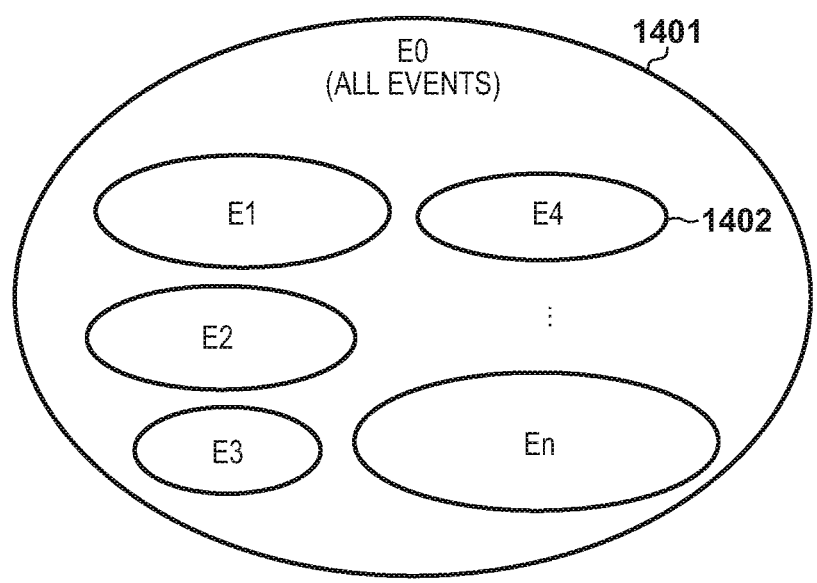
FIG. 14 is a view showing image groups to which event IDs are assigned.

FIG. 14 shows the relationship between events. An event is defined as an event (group) in which one or a plurality of images are captured. An event with an event ID "E0" contains other events (E1 to En). An event 1401 represents an image group including all events, and has an event ID "E0". An event 1402 has an ID assigned to the image group of a specific event such as travel or an athletic meet. Images 302 and 303 are images captured in the same event because they have the same event ID. Three faces are identified in the image 302, and two faces are identified in the image 303. As a face ID, the face identifying unit 203 registers the ID of a face having a matching feature amount from the information of a face dictionary (not shown) registered in advance by the user. If no matching face exists, no face ID needs to be registered in the image management table 301. Alternatively, a new face ID may be assigned to the face dictionary and registered in the image management table 301.

A person score table 401 shown in FIG. 4 is a table of person scores calculated by the person score calculation unit 204. The person score table 401 is formed from an event ID, a face ID used to identify a person who appears in the event, the appearance count in the same event, and the importance degree of the person in the event. As indicated by a row 402, the event ID "E0" indicates all events, and the appearance counts and the person scores are values calculated from images included in all events.

[Processing Procedure]

Figure 5:
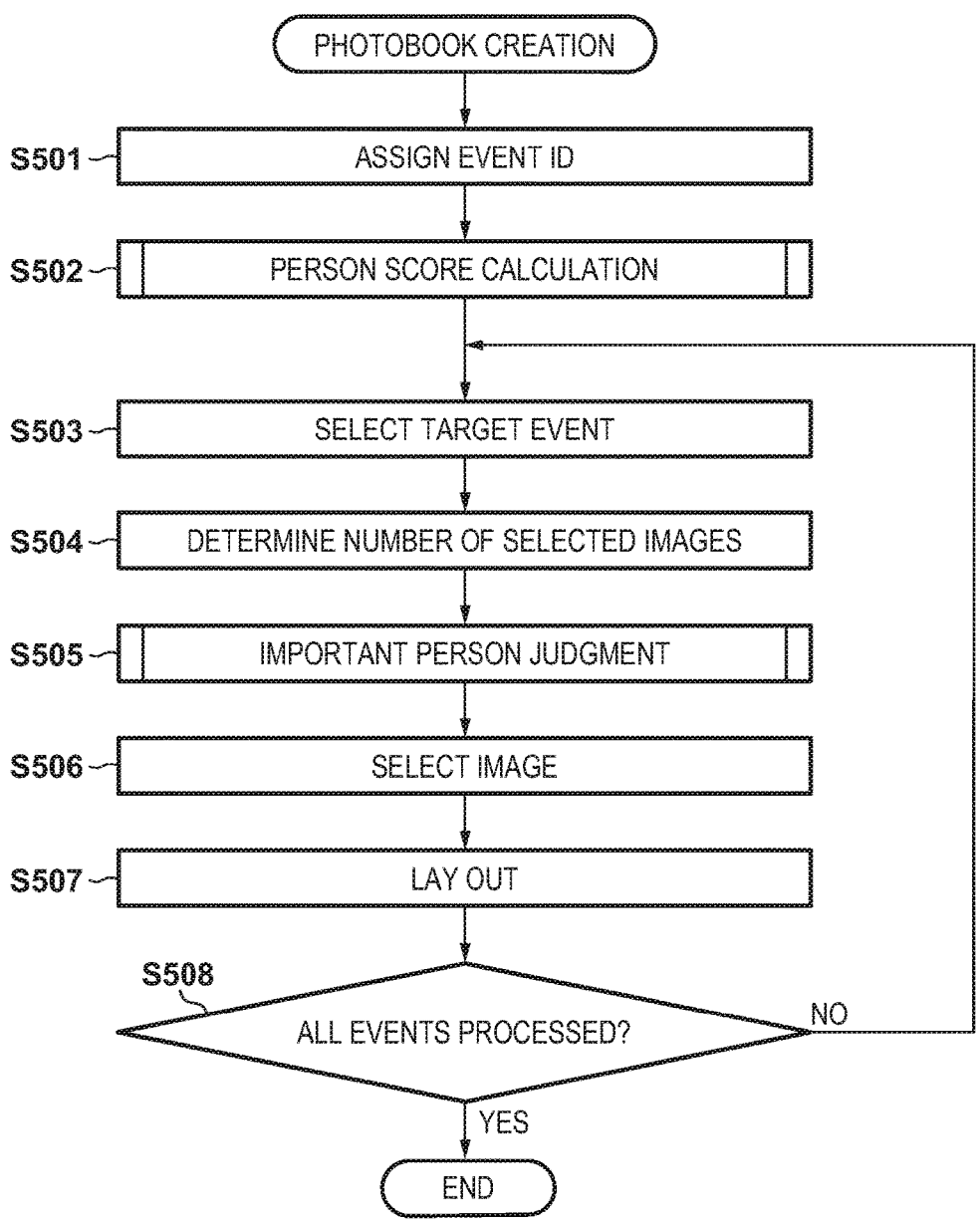
FIG. 5 is a flowchart of processing of creating a photobook according to the first embodiment.

FIG. 5 is a flowchart showing an operation of causing the photobook creation apparatus 210 to create a photobook using the information of an important person judged by the important person judging apparatus 200. This processing procedure is implemented when the CPU 101 of the photobook creation apparatus 210 reads out and executes a program stored in the ROM 103, or the like.

Assume that image files and identified face IDs are assigned to the image management table 301 before the user starts photobook creation. That is, the processes of the face detection unit 202 and the face identifying unit 203 are assumed to be completed.

In step S501, the image management unit 201 assigns an event ID to each image. Which images should be assigned the same event ID can be judged by using the information of a folder configuration storing the images or by time-serially arranging the images and dividing them at a position where the time difference between images becomes equal to or more than a threshold.

Figure 6:
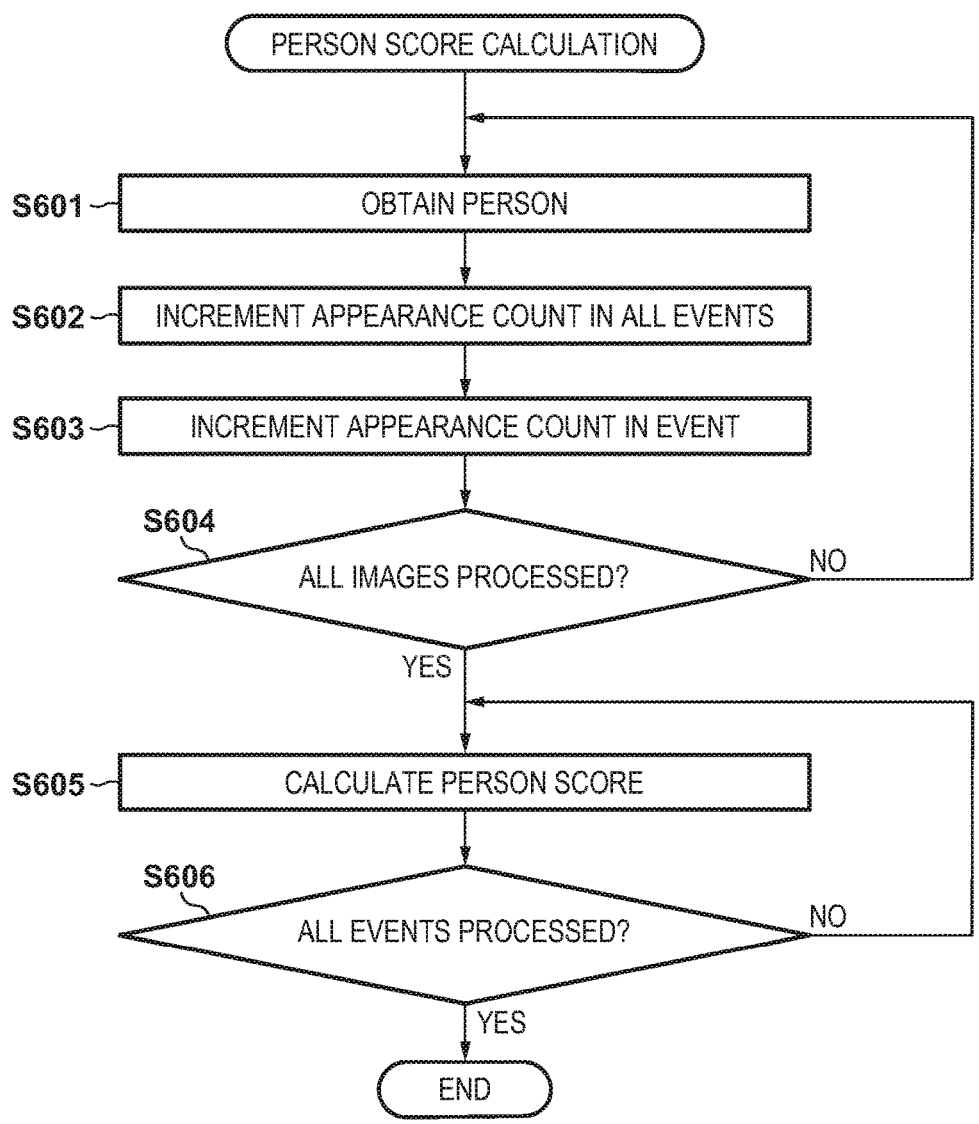
FIG. 6 is a flowchart of person score calculation processing according to the first embodiment.

In step S502, the person score calculation unit 204 generates the information of the person score table 401 in accordance with a processing procedure shown in FIG. 6 based on the image information managed by the image management unit 201. Details of this step will be described later with reference to FIG. 6.

In step S503, the important person judging unit 205 selects one target event as the target of photobook creation from all events usable to create a photobook. The target event can be selected from all events managed in the image management table 301 or from events during a period designated by the user.

In step S504, the important person judging unit 205 determines the number of images to be selected from the target event based on the information of the page count of the photobook. The number of images can be fixed for each event or calculated from the number of images of the target event.

Figure 7:
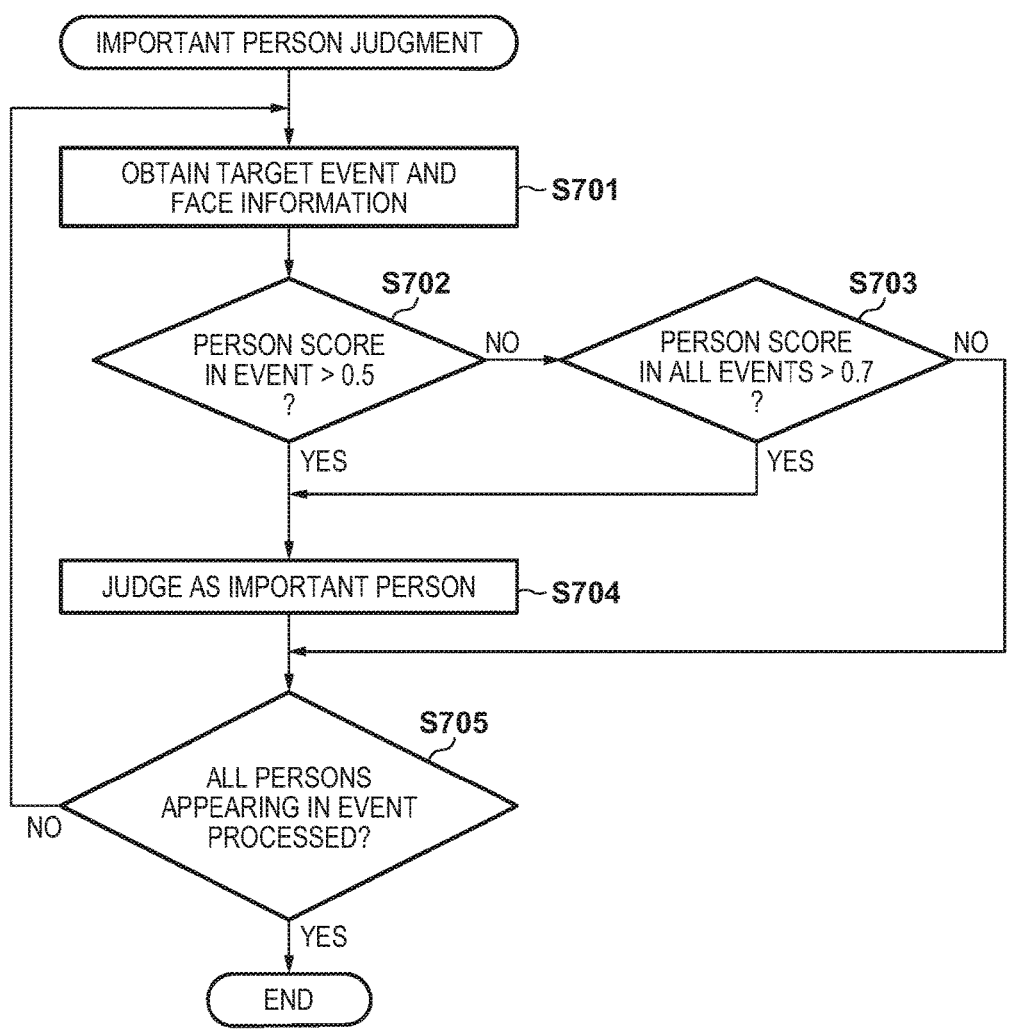
FIG. 7 is a flowchart of important person judging processing according to the first embodiment.

In step S505, based on the information of the person score table 401, the important person judging unit 205 judges, in accordance with a processing procedure shown in FIG. 7, whether each person appearing in the target event is an important person. Details of this step will be described later with reference to FIG. 7.

In step S506, the image selection unit 206 selects, from the image group held as the selection target candidates, images that have, in the face information on the image management table 301, the same ID as the face ID of a person judged as an important person as many as the number of selected images determined in step S504 as images to be laid out on the photobook. If the number of images including the important person is greater than the number of selected images, image quality may be evaluated based on the information of sharpness, defocus, and blur of each image, and images may be selected in descending order of evaluation value. If the number of images including the important person is low, images that are highly evaluated, but do not include the person, may be selected instead.

In step S507, the layout unit 207 lays out the selected images on a predetermined template (photobook). The layout unit 207 may use the information of the important person judged in step S505 for layout, for example, to lay out the important person in a large size or to lay out the important person at the center. In the layout, for example, the images may be laid out in accordance with the evaluation value of each important person using template data that assigns a score to each layout frame.

In step S508, the image selection unit 206 judges whether the processing is completed for all events as the target of photobook creation. If the processing is not completed for all events (NO in step S508), the process returns to step S503 to repeat the processing for an unprocessed event. If the processing is completed for all events (YES in step S508), the processing procedure is ended, thus completing photobook creation.

Note that, after the processing shown in FIG. 5, the CPU 101 performs display control to output the photobook with the images laid out to the display 106 and to cause it to display the photobook. Alternatively, the CPU 101 performs print control to output the photobook with the images laid out to a printing apparatus (not shown) and to cause it to print the photobook.

FIG. 6 is a flowchart showing an operation of calculating the score of each person and generating the information of the person score table 401 by the person score calculation unit 204. This processing corresponds to the process of step S502 in FIG. 5.

In step S601, the person score calculation unit 204 obtains the information of one unprocessed image from the image management table 301, and also obtains, from the information of the event ID and the face ID, information representing which person appears in which event. Additionally, in step S601, the person score calculation unit 204 adds the obtained information to the person score table 401. For example, if the process of step S601 is executed for the first time, the person score table 401 includes none of the information of "event", "face", "appearance count", and "score". In this case, if the information of the image 302 is obtained from the image management table 301, "E1" is obtained as an event, and "F_001", "F_005", and "F_006" are obtained as face IDs. Then, pieces of information of three rows "F_001", "F_005", and "F_006" are added to the person score table 401 as "face" corresponding to "E0" as "event". In addition, pieces of information of three rows "F_001", "F_005", and "F_006" are added as "face" corresponding to "E1" as "event".

By the process of step S604, to be described later, information addition to the person score table 401 in step S601 is executed for all images included in the image management table 301 shown in FIG. 3.

In step S602, the person score calculation unit 204 searches the person score table 401 for data by setting the event ID to "E0" and the face IDs in the processing target image obtained in step S601 to search conditions. The person score calculation unit 204 increments the appearance count by one in data detected as the result of the search. For example, if the processing target image is the image 302, the pieces of information of three rows "F_001", "F_005", and "F_006" corresponding to "E0" are searched. If no data is detected, the person score calculation unit 204 associates the event ID with a face ID, sets the appearance count to "1", and newly inserts the data. Note that, in this embodiment, the data is sorted when it is inserted. However, the data need not always be sorted.

Step S603 is a step of performing the same process as in step S602 for a specific event. In step S603, the person score calculation unit 204 searches the person score table 401 for data by setting the same event ID and face ID as those of the processing target image obtained in step S601 to search conditions. For example, if the processing target image is the image 302, the pieces of information of three rows "F_001", "F_005", and "F_006" corresponding to "E1" are searched. The person score calculation unit 204 increments the appearance count by one in data detected as the result of the search. If no data is detected, the person score calculation unit 204 associates the event ID with a face ID, sets the appearance count to "1", and newly inserts the data.

In step S604, the person score calculation unit 204 judges whether the processing is completed for all images registered in the image management table 301. If not all images are processed (NO in step S604), the process returns to step S601 to repeat the processing for an unprocessed image. The appearance counts of the persons in all events ("E0") and each event ("E1" to "E17") are thus calculated. If all images are processed (YES in step S604), the process advances to step S605.

In step S605, the person score calculation unit 204 obtains the maximum appearance count from data with the same event ID in the person score table 401. In addition, the person score calculation unit 204 calculates the person score of each person by dividing the appearance count of each data by the maximum appearance count, and registers the person score in the person score table 401. For example, the appearance count of a person corresponding to the row 402 is "192". The maximum appearance count in the event with the event ID "E0" is "213". Hence, the person score of the person corresponding to the row 402 is 192÷213=0.901. That is, the person score of another person is obtained by calculating the ratio to the maximum appearance count.

In step S606, the person score calculation unit 204 judges whether person score calculation is completed for all events, and repeats step S605 until completion. When person score calculation is completed for all events, the person score of each person registered in the person score table 401 is registered. After that, the processing procedure ends. By the above-described processing shown in FIG. 6, the person score table 401 shown in FIG. 4 is generated.

FIG. 7 is a flowchart showing an operation of judging an important person based on the information of the person score table 401 by the important person judging unit 205. This processing corresponds to the process of step S505 in FIG. 5.

In step S701, the important person judging unit 205 obtains, from the person score table 401, one piece of information of a person score in an event having the same event ID as the event ID selected in step S503 of FIG. 5. In addition, the important person judging unit 205 obtains the information of a person score having the event ID "E0" and the same face ID as the face ID of the obtained person score. For example, if the event ID selected in step S503 of FIG. 5 is "E1", the important person judging unit 205 obtains, for example, a score "0.888" corresponding to "E1" and "F_002" and a score "0.901" corresponding to "E0" and "F_002" from the person score table 401.

In step S702, the important person judging unit 205 judges whether the person score of the event selected in step S503 is greater than a predetermined threshold (first threshold). If the person score is greater than the predetermined threshold (YES in step S702), the process advances to step S704. If the person score is equal to or less than the predetermined threshold (NO in step S702), the process advances to step S703. The predetermined threshold (first threshold) is set, for example, to "0.5". However, the threshold is not limited to this and, for example, the user may be allowed to arbitrarily set the threshold.

In step S703, the important person judging unit 205 further judges whether the person score of the event E0 is greater than a predetermined threshold (second threshold). If the person score is greater than the predetermined threshold (YES in step S703), the process advances to step S704. If the person score is equal to or less than the predetermined threshold (NO in step S703), the process advances to step S705. The predetermined threshold (second threshold) is set, for example, to "0.7". However, the threshold is not limited to this and, for example, the user may be allowed to arbitrarily set the threshold.

In step S704, the important person judging unit 205 judges the person of the event of interest as an important person. That is, the person having the person score greater than the predetermined threshold (the first threshold or the second threshold) is judged to be an important person.

In step S705, the important person judging unit 205 judges whether all persons having the same event ID as that of the event selected in step S503 are processed. If not all persons are processed (NO in step S705), the process returns to step S701 to repeat the processing for an unprocessed person. If all persons are processed (YES in step S705), the important person judging unit 205 outputs the list of persons judged as important persons in a specific event and all events in step S704, and ends the processing procedure.

By the above-described processing shown in FIG. 7, an important person is judged in the image group of the target event (for example, "E1") as the target of photobook creation. More specifically, when the person score in the target event exceeds a predetermined threshold (YES in step S702), and when the person score in a plurality of events ("E0"), including the target event exceeds a predetermined threshold (YES in step S703), the person of the judgment target is judged as an important person. Hence, for example, even in a case in which the appearance count of the photographer himself/herself is low in the target event as the target of photobook creation, if the photographer were captured many times in other events, he/she is judged to be an important person.

In this embodiment, an important person is judged based on whether the person score in a specific event and the person score in all events are greater than predetermined values. As another method, the judgment may be done based on whether a sorted person score is ranked in a predetermined place or more, or whether a person score is equal to or more than a value calculated based on the information of person scores such as the average value of the person scores. In the above description, as the method of determining the importance degree of a person, an example in which the person score calculation unit 204 refers to a person score using the ratio of the appearance count to that of another person has been described. However, the method is not limited to this. For example, persons may be sorted based on the appearance counts, and the importance degree of each person may be determined in accordance with the place in sorting.

As described above, according to this embodiment, an important person in each event can more correctly be judged by judging the important person, not only in the image group of a specific event as the target of photobook creation, which is part of a plurality of events, but also, in the image groups of the plurality of events. For example, when judging an important person from a specific event out of image groups in a year and creating a photobook, a person whom the user rarely sees on an annual basis, but who is important in an event, for example, a friend in a class reunion or a relative the user sees during a homecoming visit, can be judged to be an important person. In addition, a person who appears rarely in an event, but many times on an annual basis, can also be judged to be an important person.

Since an image including the important person is selected in step S506 of FIG. 5 described above as an image to be output, an appropriate image can be selected from the image group of the specific event as the target of photobook creation.

Second Embodiment

In the first embodiment, not only an important person in all events to be used to create a photobook, but also, an important person in an event is judged on an event basis. In this embodiment, when judging an important person in an event, if the information of the appearance count is short because, for example, the number of images is insufficient, and the person score cannot be calculated, the information of a similar event is used to compensate for this. A description of a portion that overlaps the first embodiment will be omitted, and different points will be described below.

[System Arrangement]

Figure 8:
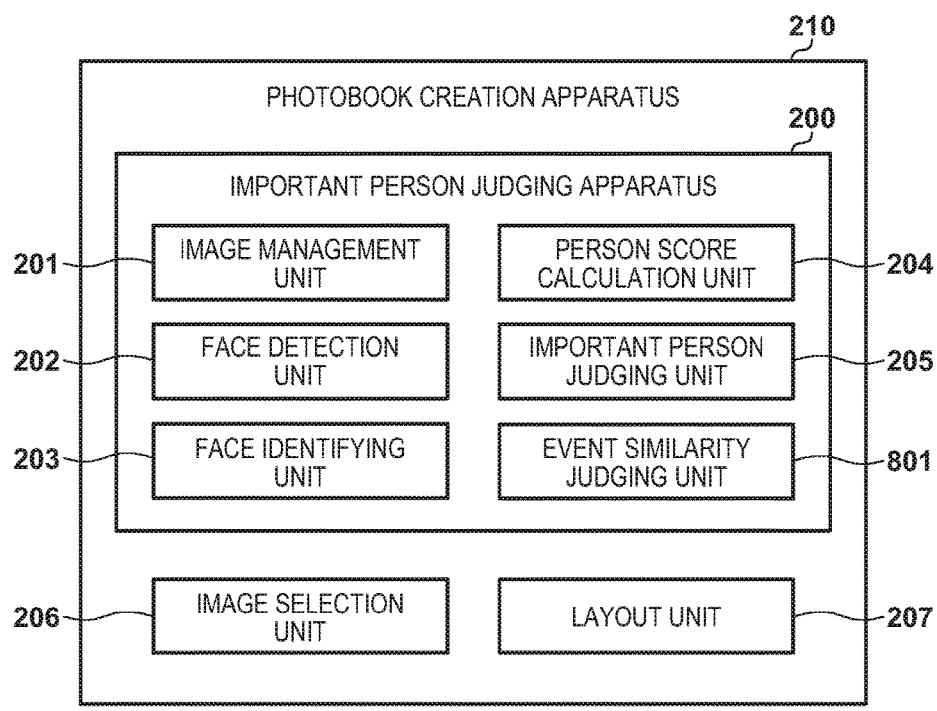
FIG. 8 is a block diagram showing an example of the functional arrangements of apparatuses according to the second embodiment.

FIG. 8 shows an example of the functional arrangement of a photobook creation apparatus according to this embodiment. In this embodiment, in an important person judging apparatus 200, an event similarity judging unit 801 that judges whether events are similar is added. The event similarity judging unit 801 judges whether two events are similar using a person list table 901 shown in FIG. 9. In this embodiment, whether events are similar is judged based on the information of persons. However, whether events are similar may be judged using other information, such as the position information of an image included in an event.

The person list table 901 shown in FIG. 9 is the list of persons who appear in the same event. The person list table 901 is formed from a list of event IDs and the face IDs of persons who appear in the events. For example, in rows 902 and 903, the person lists are similar. For this reason, the event similarity judging unit 801 judges that the events are similar in a processing procedure shown in FIG. 11.

A table 1001 shown in FIG. 10A represents a state in which information necessary to calculate a person score is short in a person score table 401 shown in FIG. 4. A row 1002 indicates an event in which the person score cannot correctly be judged because the information of the appearance count is short. In a row 1003, the information of the row 1002 is compensated for by the processing procedure shown in FIG. 11. FIG. 10B shows a state after compensation of the information.

[Processing Procedure]

Figure 11:
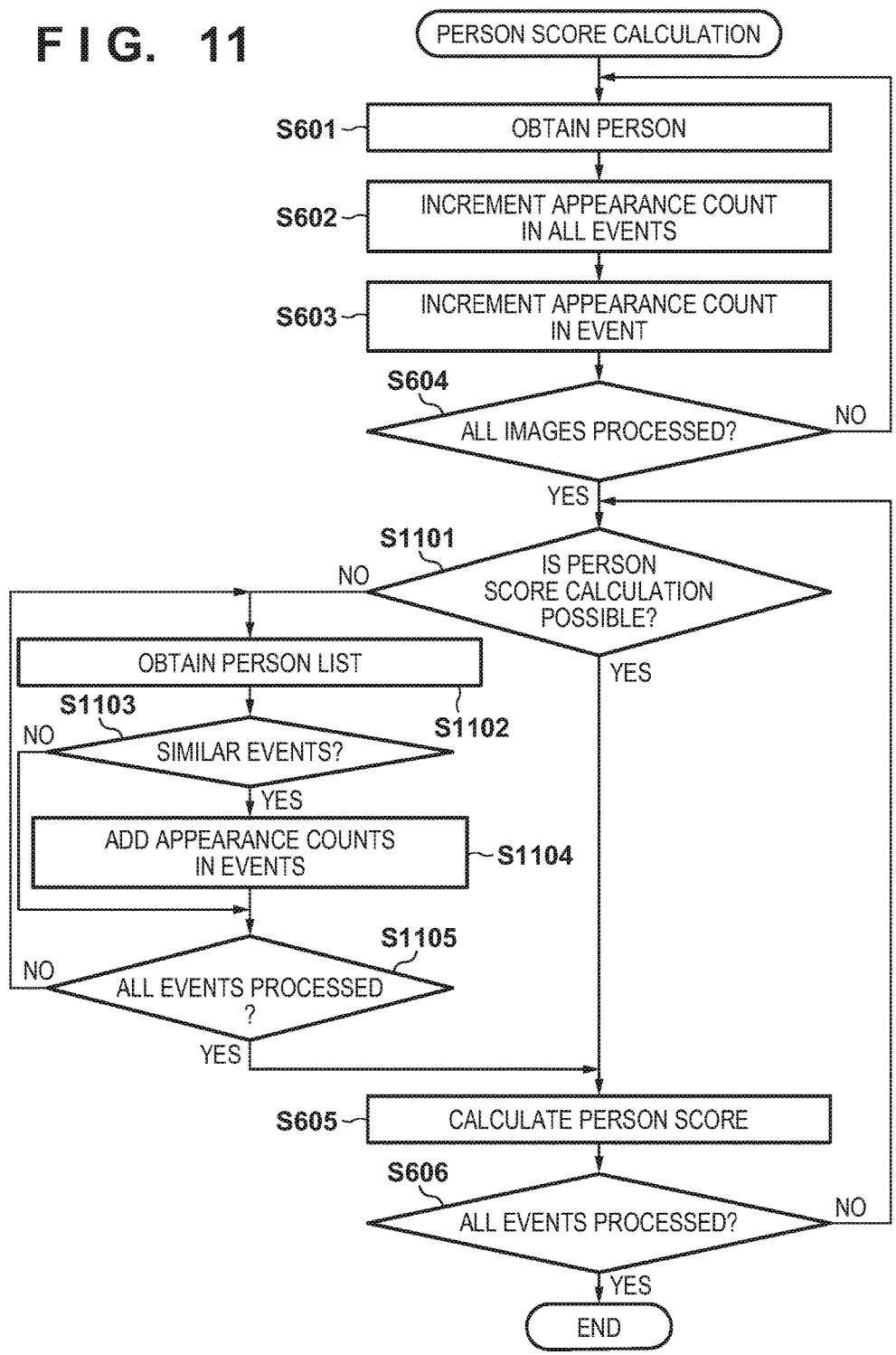
FIG. 11 is a flowchart of person score calculation processing according to the second embodiment.

FIG. 11 is a flowchart of person score calculation processing according to this embodiment. This processing corresponds to the process of step S502 shown in FIG. 5. As the difference from the first embodiment (FIG. 6), if the information of an appearance count is short, and a person score cannot be calculated, the information is compensated for by the information of a similar event.

In steps S601 to S604, a person score calculation unit 204 calculates the appearance count of a person in each event. After the appearance count of the person in all images is calculated (YES in step S604), the process advances to step S1101.

In step S1101, the person score calculation unit 204 confirms the maximum appearance count in an event in which a person score is not calculated, and compares the maximum appearance count with a predetermined value, thereby judging whether a person score can be calculated, without using the appearance count of the person in another event. The predetermined value is set, for example, to 10. In this case, for example, the maximum appearance count in the event of the row 1002 shown in FIG. 10A is 5. Since the maximum appearance count is less than the predetermined value, the person score calculation unit 204 judges that the person score cannot be calculated. The judgment may be done based on the number of images included in the event as well as the information of the appearance count. Upon judging that the person score cannot be calculated (NO in step S1101), the process advances to step S1102 to compensate for the information of the appearance count by the information of a similar event. Upon judging that the person score can be calculated (YES in step S1101), the process advances to step S605.

In step S1102, the person score calculation unit 204 obtains the person list of an event in which the person score cannot be calculated, and that of an event whose similarity is to be judged from the person list table 901 shown in FIG. 9. The person list table 901 is created by collecting face IDs registered in correspondence with the same event ID from the information of the person list table 1001 when the process of step S1102 is performed for the first time.

In step S1103, the person score calculation unit 204 compares the two person lists obtained by the event similarity judging unit 801 and judges whether they are similar. The similarity is judged here by judging whether all face IDs of the person list of the event in which the person score cannot be calculated are included in the other person list. For example, if the row 902 in FIG. 9 indicates the event in which the person score cannot be calculated, the row 903 is judged as a similar event, because it includes all the face IDs of the persons in the row 902. Note that, as another method, the judgment may be done by dividing the number of face IDs that match between the lists by the total number of face IDs to calculate the similarity and judging whether the similarity is greater than a predetermined value. If the events are similar (YES in step S1103), the process advances to step S1104. If the events are not similar (NO in step S1103), the process advances to step S1105.

In step S1104, the person score calculation unit 204 adds the appearance count in the similar event to the appearance count in the event in which the person score cannot be calculated. For example, when the appearance count in the row 1003 is added to the appearance count in the row 1002 shown in FIG. 10A, the value in the row 1002 shown in FIG. 10B is obtained. After this step, the process advances to step S1105.

In step S1105, the person score calculation unit 204 judges whether all events in which the person score cannot be calculated have undergone the similarity judgment with other events. If not all events are processed (NO in step S1105), the process returns to step S1102 to repeat the processing for an unprocessed event. If all events are processed (YES in step S1105), the process advances to step S605.

In step S605, for example, the person score in the event of the row 1002 shown in FIG. 10A changes to the person score in the row 1002 shown in FIG. 10B. If no similar event exists, or the information is still short after addition of the appearance count in a similar event, an important person in the event may be judged to be absent, or the person score may be calculated using only the obtained information of the appearance count.

As described above, according to this embodiment, even if the information of the appearance count is short, and the person score cannot be calculated, it is possible to calculate a more correct person score and to judge an important person by compensating for the information by the appearance count in a similar event. For example, if the number of images is low in an event in which a child is captured in a day nursery, it may be impossible to judge a close friend as an important person, because his/her appearance count and the appearance counts of other friends have no difference. However, when the information of a similar event captured in the day nursery is used, a difference is generated between the appearance count of the close friend and the appearance counts of other friends, and the close friend can be judged to be an important person.

Third Embodiment

In the first embodiment, in both a case in which a person score in all events is calculated and a case in which a person score in each event is calculated, the number of images including a person is used as the information of the appearance count. On the other hand, in this embodiment, when calculating a person score in all events, the number of events (image groups) including at least one image with a person is used as the information of the appearance count. This makes it possible to judge even a person (for example, the photographer) who tends to be captured rarely as an object as an important person. A description of a portion that overlaps the first embodiment will be omitted, and different points will be described below.

Figure 13:
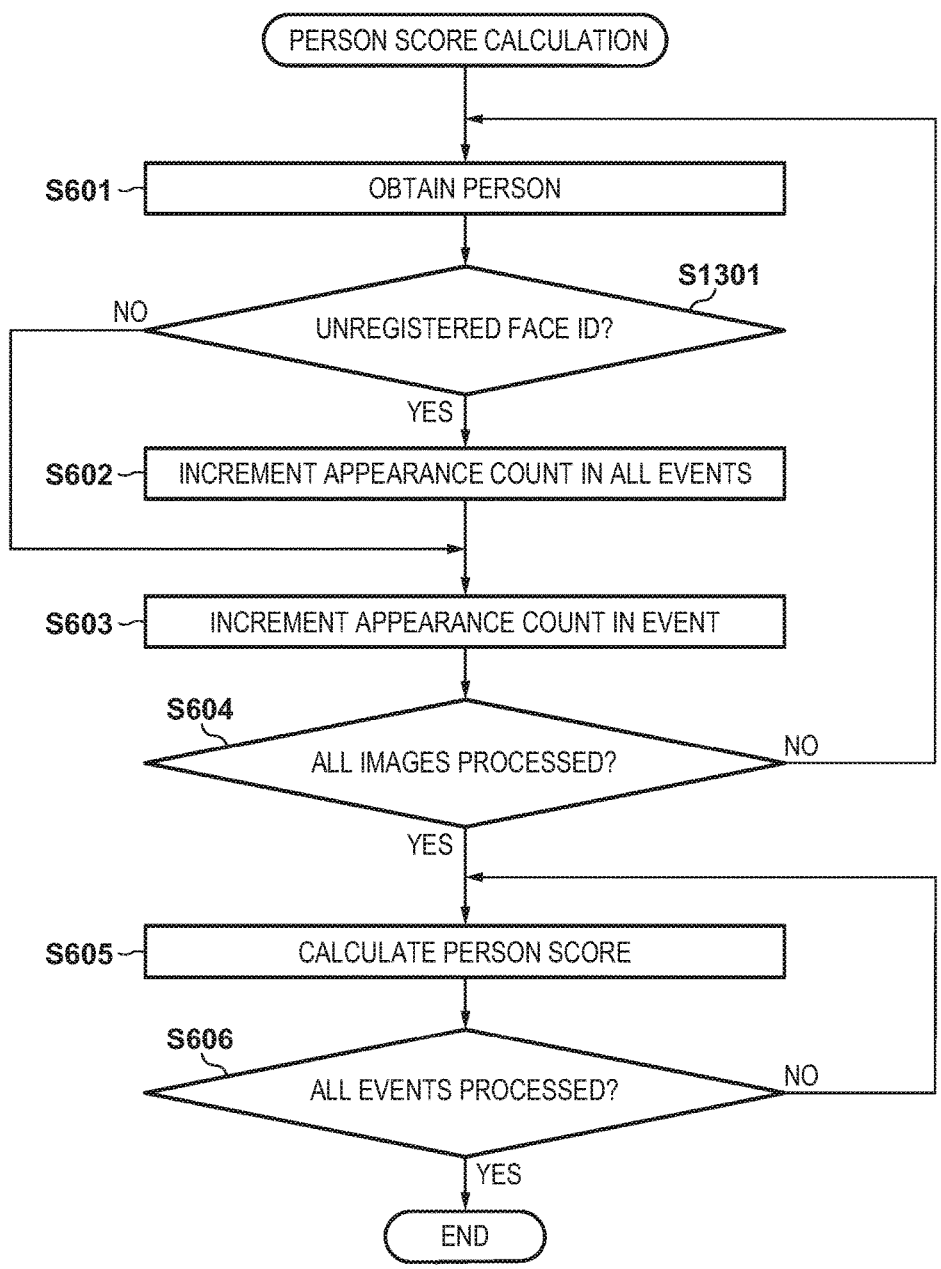
FIG. 13 is a flowchart of person score calculation processing according to the third embodiment.

A table 1201 shown in FIG. 12 represents a state in which appearance counts in all events indicated by an event ID "E0" are calculated using the number of events in a person score table 401 shown in FIG. 4 in accordance with a processing procedure shown in FIG. 13.

In FIG. 13, the flowchart of calculating a person score in FIG. 6 is changed to calculate the appearance count in the event indicated by the event ID "E0" using the number of events including a person. This processing corresponds to the process of step S502 shown in FIG. 5.

When the pieces of information of an event ID and a face ID are obtained in step S601, in step S1301, a person score calculation unit 204 searches the person score table 1201 for data by setting the same event ID as the obtained event ID and the same face ID as that of a person to search conditions. If data that meets the conditions is not detected as the result of search (YES in step S1301), the person is judged as a person who newly appears, and the process advances to step S602. If data is detected (NO in step S1301), the person is judged as a person who already appeared in an event, and the process advances to step S603.

In step S602, the person score calculation unit 204 increments the appearance count in all events (E0) by one. That is, when calculating the person score of each person in all events (E0), the calculation is performed using the number of events (image groups) in which the person appears. On the other hand, when calculating the person score of each person in each event (E1 to En), the calculation is performed using the number of images in which the person appears. Note that the thresholds (the first threshold and the second threshold) in steps S702 and S703 of FIG. 7 may be set in consideration of the difference between the person score calculation methods.

As described above, according to this embodiment, even the photographer who tends to be captured rarely as an object can be judged to be an important person by using the appearance count in an event with the person. For example, even if the number of images, including the family, is many times greater than the number of images including the photographer in each event, he/she can be judged to be an important person, if there is at least one image including the photographer in each event. In addition, a person, such as a passerby who happened to be captured unlikely, appears in each event is, therefore, never judged to be an important person by mistake.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing method, executed by at least one processor in an information processing apparatus, the method comprising:
   identifying a first image group that is contained in a second image group, the second image group containing a plurality of image groups including the first image group;
   counting, based on the identifying, a number of images in which a target person appears among a plurality of images in the first image group;
   counting a number of image groups in which the target person appears among the plurality of image groups contained in the second image group;
   determining, whether the target person is an important person, based on at least one of a first importance degree that is calculated using the number of images in which the target person appears in the first image group and a second importance degree that is calculated using the number of image groups in which the target person appears in the second image group; and
   generating layout data by arranging an image based on the determination result of the important person,
   wherein, in a case in which the first importance degree exceeds a first threshold, the target person is determined to be the important person, and in a case in which the second importance degree exceeds a second threshold, even if the first importance degree does not exceed the first threshold, the target person is determined to be the important person.

2. The method according to claim 1, wherein the first importance degree is calculated by a ratio of the number of images in which the target person appears in the first image group to the number of images in which a person who appears most frequently in the first image group.

3. The method according to claim 1, wherein it is judged whether the first importance degree can be calculated using the number of the images in which the target person appears in the first image group, and, upon judging that the first importance degree cannot be calculated, a third image group similar to the first image group is specified out of the plurality of image groups contained in the second image group, and the first importance degree is calculated using the number of the images in which the target person appears in the first image group and a number of the images in which the target person appears in the third image group.

4. The method according to claim 3, wherein in the determining, if the number of the images in which the target person appears in the first image group is less than a predetermined threshold, it is judged that the first importance degree cannot be calculated using the number of the images in which the target person appears in the first image group.

5. The method according to claim 3, wherein in the determining, an image group in which all persons appearing in the first image group appear is specified as the third image group similar to the first image group.

6. The method according to claim 1, further comprising:
   detecting a face of a person from an image; and
   identifying the face detected in the detecting,
   wherein the number of the images in which the target person appears is counted, based on a result of processing of each of the detecting and the identifying.

7. The method according to claim 1, wherein the plurality of image groups is defined for each event in which an image is captured.

8. The method according to claim 1, wherein the layout data is generated by arranging, on a predetermined template, the image selected based on the determination result.

9. The method according to claim 8, wherein a photobook based on the layout data is displayed on a display device.

10. The method according to claim 8, wherein a photobook based on the layout data is printed by a printing apparatus.

11. An information processing apparatus comprising:
    at least one processor and a memory storing instructions which, when executed by the at least one processor, cause the information processing apparatus:
    to identify a first image group that is contained in a second image group, the second image group containing a plurality of image group including the first image group;
    to count, based on the identification, a number of images in which a target person appears among a plurality of images in the first image group;
    to count a number of image groups in which the target person appears among the plurality of image groups contained in the second image group;
    to determine whether the target person is an important person, based on at least one of a first importance degree that is calculated using the number of images in which the target person appears in the first image group and a second importance degree that is calculated using the number of image groups in which the target person appears in the second image group; and
    to select to generate layout data by arranging an image based on the determination result of the important person,
    wherein, in a case in which the first importance degree exceeds a first threshold, the target person is determined to be the important person, and, in a case in which the second importance degree exceeds a second threshold, even if the first importance degree does not exceed the first threshold, the target person is determined to be the important person.

12. The apparatus according to claim 11, wherein the first importance degree is calculated by a ratio of the number of images in which the target person appears in the first image group to the number of images in which a person who appears most frequently in the first image group.

13. The apparatus according to claim 11, wherein it is judged whether the first importance degree can be calculated using the number of the images in which the target person appears in the first image group, and, upon judging that the first importance degree cannot be calculated, specifies a third image group similar to the first image group out of the plurality of image groups contained in the second image group, and the first importance degree is calculated using the number of the images in which the target person appears in the first image group and a number of the images in which the target person appears in the third image group.

14. The apparatus according to claim 13, wherein, if the number of the images in which the target person appears in the first image group is less than a predetermined threshold, it is judged that the first importance degree cannot be calculated using the number of the images in which the target person appears in the first image group.

15. The apparatus according to claim 13, wherein the determination unit specifies an image group in which all persons appearing in the first image group appear as the third image group similar to the first image group.

16. The apparatus according to claim 11, wherein the instructions which, when executed by the at least one processor, further cause the information processing apparatus:
to detect a face of a person from an image; and
to identify the face detected by the detection unit,
wherein the number of the images in which target person appears is counted based on a result of processing of each of the detection and the identifying.

17. The apparatus according to claim 11, wherein the plurality of image groups is defined for each event in which an image is captured.

18. A non-transitory computer-readable storage medium storing a program that causes a computer to function:
to identify a first image group that is contained in a second image group, the second image group containing a plurality of image group including the first image group;
to count, based on the identification, a number of images in which a target person appears among a plurality of images in the first image group;
to count a number of image group in which the target person appears among the plurality of image groups contained in the second image group;
to determine whether the target person is an important person, based on at least one of a first importance degree that is calculated using the number of images in which the target person appears in the first image group and a second importance degree that is calculated using the number of image groups in which the target person appears in the second image group; and
to generate layout data by arranging an image based on the determination result of the important person,
wherein, in a case in which the first importance degree exceeds a first threshold, the target person is determined to be the important person, and, in a case in which the second importance degree exceeds a second threshold, even if the first importance degree does not exceed the first threshold, the target person is determined to be the important person.

* * * * *